United States Patent Office 3,803,318
Patented Apr. 9, 1974

3,803,318
COMBATING FUNGI WITH SUBSTITUTED CARBONYL-CARBAMIDYL-BENZIMIDAZOLE-2-YL-CARBAMIC ACID ESTERS
Arno Widdig, Blecher, Klaus Sasse, Schildgen, Ferdinand Grewe, Burscheid, and Hans Scheinpflug, Paul-Ernst Frohberger, and Helmut Kaspers, Leverkusen, Germany, assignors to Bayer Aktiengesellschaft, Leverkusen, Germany
No Drawing. Original application June 30, 1970, Ser. No. 51,381, now Patent No. 3,711,503, dated Jan. 16, 1973. Divided and this application Sept. 13, 1972, Ser. No. 288,624
Claims priority, application Germany, July 16, 1969, P 19 36 130.9
Int. Cl. A01n 9/22, 9/24
U.S. Cl. 424—273                     11 Claims

ABSTRACT OF THE DISCLOSURE

1-[N-(alkyl, cycloalkyl, phenyl or substituted phenyl)—S— or —O—carbonyl-carbamidyl]-benzimidazole-2-yl-carbamic acid alkyl ester, which possess fungicidal properties.

---

This is a division of application Ser. No. 51,381 filed June 30, 1970, now Pat. No. 3,711,503 issued Jan. 16, 1973.

The present invention relates to and has for its objects the provision of particular new 1-[N-(alkyl, cycloalkyl, phenyl or substituted phenyl)—S— or —O—carbonyl-carbamidyl]-benzimidazole-2-yl-carbamic acid alkyl esters, which possess fungicidal properties, active compositions in the form of mixtures of such compounds with solid and liquid dispersible carrier vehicles, and methods for producing such compounds and for using such compounds in a new way especially for combating fungi, with other and further objects becoming apparent from a study of the within specification and accompanying examples.

It is known that N-trichloromethylthiotetrahydrophthalimide can be used as a fungicide (A) (cf. U.S. patent specification 2,553,770). It has moreover attained considerable importance in practice. Although this fungicide does have a broad spectrum of activity, there are nevertheless many phytopathogenic fungi against which it is ineffective or inadequately effective. Moreover, it has no systemic activity worth mentioning.

It has now been found, in accordance with the present invention, that particular new benzimidazole derivatives of the general formula

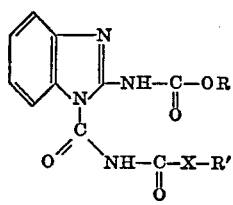

in which

X stands for oxygen or sulfur,
R stands for lower alkyl, and
R' stands for alkyl with 5 to 12 carbon atoms (when X stands for oxygen), or for alkyl with 1 to 12 carbon atoms (when X stands for sulfur), or for cycloalkyl with 5 to 12 carbon atoms, or for (possibly substituted) aryl or aralkyl.

Preferably,

R stands for alkyl with 1 to 3 carbon atoms,
R' stands for alkyl such as n-butyl, n-octyl or n-dodecyl or for (possibly substituted) phenyl or cyclohexyl, exhibit strong fungicidal properties.

It has been furthermore found, in accordance with the present invention that a process for the production of a benzimidazole of the Formula I above in which a benzimidazole-2-carbamic acid ester of the formula

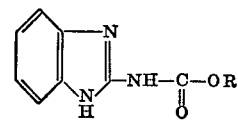

in which

R is the same as defined above is reacted with an isocyanate of the formula

in which

X and R' are the same as defined above in the presence of a diluent.

Surprisingly, the benzimidazoles according to the present invention show a high fungicidal activity than the above-mentioned N-trichloromethylthiotetrahydrophthalimide. The compounds according to the present invention therefore represent a valuable contribution to the art.

When benzimidazole-2-carbamic acid methyl ester and 4-tert.-butylphenoxycarbonylisocyanate are used as starting materials, the reaction course can be represented by the following formula scheme:

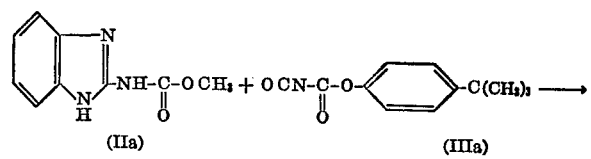

(IIa)      (IIIa)

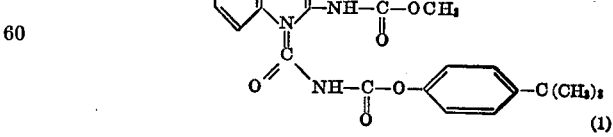

(I)

The benzimidazole-2-carbamic acid esters used as starting materials are clearly defined by the Formula II above.

As examples of benzimidazole-2-carbamic acid esters, there may be mentioned: benzimidazole-2-carbamic acid methyl ester, benzimdiazole-2-carbamic acid ethyl ester, and the like.

The benzimidazolecarbamic acid esters to be used as starting materials are known; they may be prepared for example for o-phenylenediamines and N-cyanocarbamic acid esters in acetic acid solution (cf. South African patent application 67/6509).

The isocyanates required as starting materials are prepared for example from chlorocarbonylisocyanate and alcohols or phenols, or chlorocarbonylisocyanate and alcohols or phenols or mercaptans in inert solvents, such as in diethyl ether (cf. in this connection German patent application P 17 93 088.0). They are generally defined by the Formula III above.

As examples of isocyanates, there may be mentioned: octoxycarbonyl isocyanate, butylmercaptocarbonyl isocyanate, dodecylmercaptocarbonyl isocyanate, cyclohexoxycarbonyl isocyanate, phenylmercapto-carbonyl isocyanate, 4-tert.-butylphenoxycarbonyl isocyanate and phenoxycarbonyl isocyanate.

The diluent used in the process according to the present invention may be any organic solvent inert to isocyanates. Preferred examples include hydrocarbons, such as benzine and benzene; chlorinated hydrocarbons, such as chlorobenzene and chloroform; ethers, such as diethyl ether and dioxan; and mixtures of these solvents.

The reaction temperatures can be varied within a fairly wide range. In general, the reaction is carried out at from substantially between about 0 to 80° C., preferably between about 10 to 50° C.

When carrying out the production process according to the invention, the reactants are preferably used in substantially equimolar amounts. Amounts smaller or greater by up to 20% are possible without substantial loss of yield.

The present active compounds have not only the good properties of outstanding commercial agents but also other great advantages. One is their ability to penetrate into the plant and be conducted systemically and so act fungitoxically away from the place of application. They can be taken up by the seed surface or the roots or above-the-soil organs of plants after external application. Another advantage is the ability to become loco-systemically active, i.e. to exercise deep action in plant tissue and eliminate fungal pathogens which have already pentrated into the plant tissue. Moreover, the present substances are much more effective than known commercial agents against various fungal plant disease organisms, such as apple scab, Piricularis and Pellicularia, bunt of wheat and many phytopathogenic soil fungi. They are also effective against mold fungi, yeasts and bacteria, indeed even against insects and mites.

As crop protection agents, the present substances can be used for example for soil treatment, seed treatment and treatment of above-the-soil parts of plants. They are particularly effective against *Fusicladium dendriticum, Erysiphe cichoracearum, Podosphaera leucotricha, Pricularia oryzae, Pellicularia sasakii, Tilletia caries, Erysiphe graminis, Sclerotinia sclerotiorum, Verticillium alboatrum, Thielaviopsis basicola, Fusarium culmorum, Fusarium oxysporum, Fusarium dianthi, Phialophora cinerescens* and *Cercospora musae.*

The present substances are well tolerated by plants. The following attributes facilitate their handling by humans: they have only a slight toxicity to warm-blooded animals; they have only a slight oder; there is no deleterious effect on human skin.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles, such as solutions, emulsions, suspensions, emulsifiable concentrates, spray powders, oils, pastes, soluble powders, dusting agents, granules, tablets, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents and non-solvents, such as aromatic hydrocarbons (e.g. benzene, toluene, xylene, dimethyl naphthalene, aromatic naphthas, etc.) halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, diatomaceous earth, clay montmorillonite, etc.), and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying or wetting agents, such as non-ionic and/or anionic emulsifying or wetting agents (e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides, or herbicides, insecticides, acaricides, nematocides, bactericides, etc., including, especially fungicidal, organo-phosphorus compounds, carbamate, compounds, dithiocarbamate compounds, chlorine compounds, dinitro compounds, organic sulfur or copper compounds, substituted phenoxy compounds, chlorophenols, substituted diphenyl ethers, anilide compounds, ureas, triazines, antibiotics, and other known agricultural chemicals and/or fertilizers, if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplate those in which the active compound is present in an amount substantially between about 0.001–10%, preferably 0.01–5%, by weight of the mixture. Thus, the present invention contemplates overall compositions which comprise mixtures of a conventional dispersible carrier vehicle such as (1) a dispersible inert finely divided carrier solid, and/or (2) a dispersible liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally about 0.001–95%, and preferably 0.01–95%, by weight of the mixture.

Generally, the active compound is used in dosage amounts per unit area of substantially between about 15–1,000 g., preferably 40–600 g., and most preferably 40–100 g., per 10 areas, irrespective of the presence or absence of such carrier vehicle.

The active compounds can also be used in accordance with the well-known ultra-low-volume process with good success, i.e. by applying such compound if normally a liquid, or by applying a liquid composition containing the same, via very effective atomizing equipment, in finely divided form, e.g. average particle diameter of from 50–100 microns; or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possbile to use highly concentrated liquid compositions with said liquid carrier vehicles containing from about 20 to about 95% by weight of the active compound, or even the 100% active substance alone, e.g. about 20–100% by weight of the active compound.

In particular, the present invention contemplates methods of selectively killing, combating or controlling fungi, which comprise applying to at least one of (a) such fungi and (b) their habitat, i.e. the locus to be protected, a fungicidally effective or toxic amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, dry dressing, moist dressing, wet dressing, paste dressing, via incrustation; and the like.

Significantly, the fungicidal compositions of the present invention can be applied for example by spraying a dust formulation directly onto stems and leaves of plants; or by using the formulation as a seed-dressing; by spraying an emulsifiable concentrate, diluted with water, etc. to a desirable concentration, onto stems and leaves of plants; by suspending a wettable powder in water at a desirable concentration, onto stems and leaves of plants; by suspending a wettable powder in water at a desirable concentration and spraying the formulation onto stems and leaves of plants; by applying granule formulations to the soil, and the like.

When the compounds are used as leaf fungicides, the concentrations of active compound in the application forms can be varied within a fairly wide range. They are, in general, from 0.5 to 0.0005, preferably 0.2 to 0.001, percent by weight.

In the case of seed treatment, there are required, in general, amounts of active compound of 0.01–50 g., preferably 0.5–5 g., per kilogram of seed.

For soil treatment, amounts of active compound of 1–1000 g., preferably from 10–200 g., per cubic meter of soil are generally necessary.

It will be realized, of course, that the concentration of the particular active compound utilized in admixture with the carrier vehicle will depend upon the intended application, the purpose for which the active compound is used, and the like. Therefore, in special cases, it is possible to go above or below the aforementioned concentration ranges and dosage amounts per unit area.

The fungicidal effectiveness of the particular new compounds of the present invention is illustrated, without limitation, by the following exampes:

EXAMPLE 1

Erysiphe test

Solvent: 4.7 parts by weight acetone.
Emulsifier: 0.3 part by weight alkylaryl polyglycol ether.
Water: 95.0 parts by weight.

The amount of the particular active compound required for the desired final concentration in the spray liquid is mixed with the stated amount of solvent, and the resulting concentrate is then diluted with the stated amount of water containing the stated emulsifier.

Young cucumber plants (Delikatess variety) with about three foliage leaves are sprayed with the given spray liquid until dripping wet. The cucumber plants remain in a greenhouse for 24 hours to dry. Such plants are then, for the purpose of inoculation, dusted with conidia of the fungus *Erysiphe polyphaga*. The plants are subsequently placed in a greenhouse at 23–24° C. and at a relative atmospheric humidity of about 75%.

After 12 days, the infestation of the cucumber plants is determined as a percentage of the untreated but also inoculated control plants. 0% means no infestation; 100% that the infestation is exactly as great as in the case of the control plants.

The particular active compounds tested, their concentrations, and the results obtained can be seen from the following Table 1.

TABLE 1
Erysiphe test

| Active compound | | Infection |
|---|---|---|
| 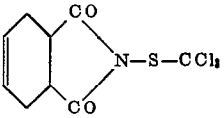 (known) | (A) | 100 |
| 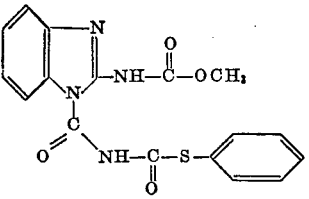 | (2) | 17 |
| 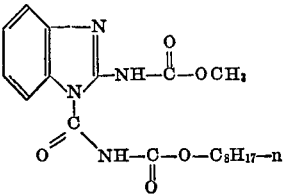 | (3) | 10 |
| 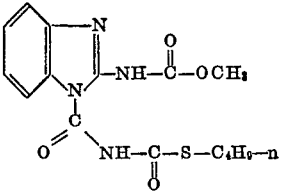 | (4) | 7 |

See footnote at end of table.

TABLE 1—Continued

| Active compound | | Infection [1] |
|---|---|---|
| benzimidazole with -NH-CO-OCH₃ and N-C(O)-NH-C(=O)-S-C₁₂H₂₅-n substituents | (5) | 17 |
| benzimidazole with -NH-CO-OCH₃ and N-C(O)-NH-C(=O)-O-C₆H₅ substituents | (6) | 13 |

[1] As a percentage of the infection of the untreated control with a concentration of active compound of 0.025.

EXAMPLE 2

Erysiphe test (systemic)

Solvent: 4.7 parts by weight acetone.
Emulsifier: 0.3 part by weight alkylaryl polyglycol ether.
Water: 95.0 parts by weight.

The amount of the particular active compound required for the desired final concentration in the treatment liquid is mixed with the stated amount of the solvent, and the resulting concentrate is then diluted with the stated amount of water containing the stated emulsifier.

Cucumber plants grown in standard soil are, in the 1–2 leaf stage, watered, within one week, thrice/once with 20 cc. of the liquid to be used for watering, in the stated concentrations of active compound, with reference to 100 cc. of soil.

The plants treated are, after treatment, inoculated with conidia of the fungus *Erysiphe cichoracearum*. The plants are subsequently placed in a green-house at 23–24° C. and at a relative atmospheric humidity of about 70%.

After 12 days, the infection of the cucumber plants is determined as a percentage of the untreated but also inoculated control plants.

0% means no infection; whereas 100% means that the infection is exactly as great as in the case of the control plants.

The particular active compounds tested, their concentrations and the results obtained can be seen from the following Table 2.

TABLE 2
Erysiphe test (systemic)

| Active compound | | Infection [1] |
|---|---|---|
| phthalimide-N-S-CCl₃ (Known) | (A) | 100 |
| benzimidazole with -NH-CO-OCH₃ and N-C(O)-NH-CO-O-C₈H₁₇-n substituents | (3) | 0 |
| benzimidazole with -NH-CO-OCH₃ and N-C(O)-NH-CO-S-C₄H₉-n substituents | (4) | 0 |
| benzimidazole with -NH-CO-OCH₃ and N-C(O)-NH-C(=O)-S-C₆H₅ substituents | (2) | 0 |
| benzimidazole with -NH-CO-OCH₃ and N-C(O)-NH-C(=O)-O-C₆H₅ substituents | (6) | 0 |
| benzimidazole with -NH-CO-OCH₃ and N-C(O)-NH-C(=O)-O-C₆H₄-C(CH₃)₃ substituents | (1) | 0 |

[1] As a percentage of the untreated control with a concentration of active compound of 120 p.p.m.

EXAMPLE 3

Powdery mildew of barley (systemic)

Application of the particular active compounds takes place as powder-form seed treatment agent. They are produced by extending the given active compound concerned with a mixture of equal parts by weight of talc and kieselguhr to give a finely powdered mixture with the desired concentration of the particular active compound.

For seed treatment, the barley seed is shaken with the extended active compound in a closed glass flask. Three batches of 12 grains of seed are sown 2 cm. deep in a mixture of one part by volume of Fruhstorfer standard soil and one part by volume of quartz sand in flowerpots. Germination and emergence take place under favorable conditions in a greenhouse 7 days after sowing, when the barley plants have unfolded their first leaf, they are dusted with fresh spores of *Erysiphe graminis* var. hordei and further cultivated at 21–22° C. and 70% relative atmospheric humidity and 16 hours exposure to light. Within 6 days, typical mildew pustules form on the leaves.

The degree of infection is determined as a percentage of the infection of the untreated control plants. Thus, 0% denotes no infection, whereas 100% the same degree of infection as in the case of the untreated control. The active compound is the more effective the smaller the mildew infection.

The particular active compounds tested, the concentrations of active compound in the seed treatment agent as well as the amount applied thereof and the percentage mildew infection can be seen from the following Table 3.

TABLE 3
Powdery mildew of barley (systemic)

| Active compounds | | Concentration of active compound in the dressing, percent by weight | Amount applied of dressing in k./kg. seed | Infection as a percentage of the untreated control |
|---|---|---|---|---|
| Non-dressed | | | | 100 |
| 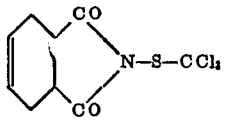 (known) | (A) | 30 | 10 | 100 |
| 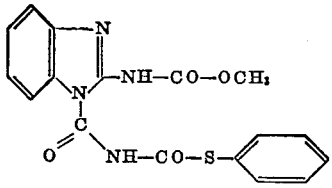 | (2) | 30 | 10 | 0 |
| 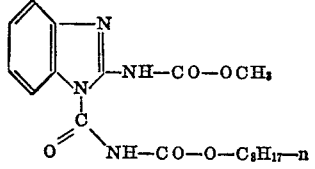 | (3) | 30 | 10 | 0 |
| 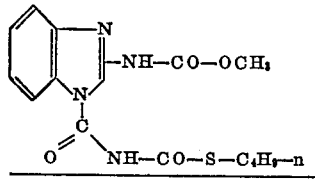 | (4) | 30 | 10 | 0 |

EXAMPLE 4

Fusicladium test (systemic)

Solvent: 4.7 parts by weight acetone.
Emulsifier: 0.3 part by weight alkylaryl polyglycol ether.
Water: 95.0 parts by weight.

The amount of particular active compound required for the desired final concentration of such active compound in the treatment liquid is mixed with the stated amount of solvent, and the resulting concentrate is then diluted with the stated amount of water containing the stated dispersing agent.

Apple seedlings grown in standard soil are, in the 3–4 leaf stage, watered once within one week with 20 cc. of the liquid to be used for watering, in the stated concentration of active compounds, with reference to 100 cc. of soil.

The plants thus treated are, after treatment, inoculated with an aqueous conidium suspension of *Fusicladium dendriticum* Fuck. and incubated for 18 hours in a humidity chamber kept at 18–20° C. and at an atmospheric humidity of 100%. The plants are then again placed in a greenhouse for 14 days.

15 days after inoculation, the infection of the seedlings is determined as a percentage of the untreated but also inoculated control plants. 0% means no infection; whereas 100% means that the infection is exactly as great as in the case of the control plants.

The particular active compounds tested, their concentrations and the results obtained can be seen from the following Table 4.

TABLE 4
Fusicladium test (systemic)

| Active compound | | Infection [1] |
|---|---|---|
| 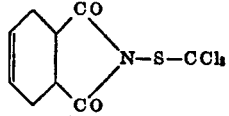 (known) | (A) | 100 |
| 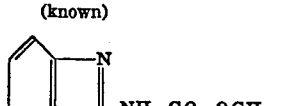 | (2) | 2 |
| 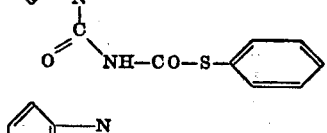 | (3) | 0 |
| 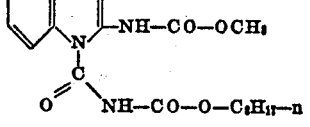 | (4) | 2 |

See footnote at end of table.

TABLE 4—Continued

| Active compound | Infection |
|---|---|
| 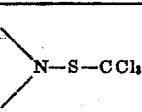 (5) | 8 |
| (6) | 0 |
| (1) | 2 |

[1] As a percentage of the infection of the untreated control with a concentration of active compound of 120 p.p.m.

EXAMPLE 5

Fusicladium test (apple scab) [Curative]

Solvent: 4.7 parts by weight acetone.
Emulsifier: 0.3 part by weight alkylaryl polyglycol ether.
Water: 95.0 parts by weight.

The amount of the particular active compound required for the desired final concentration of such active compound in the treatment liquid is mixed with the stated amount of solvent, and the resulting concentrate is then diluted with the stated amount of water containing the stated emulsifier.

Young apple seedlings in the 4–6 leaf stage are inoculated with an aqueous conidium suspension of the apple scab causative organic *Fusicladium dendriticum* Fuck. and incubated for 18 hours in a humidity chamber kept at 18–20° C. and at an atmospheric humidity of 100%. The plants are then again placed in a green-house where they dry.

After standing for a suitable period of time, the plants are then sprayed until dripping wet with the given spray liquid prepared in the manner described above. The plants are then again placed in a green-house.

15 days after inoculation, the infestation of the apple seedlings is determined as a percentage of the untreated but also inoculated control plants.

0% means no infestation; whereas 100% means that the infestation is exactly as great as in the case of the control plants.

The particular active compounds tested, their concentrations, the period of time between inoculation and spraying and the results obtained can be seen from the following Table 5.

TABLE 5
Fusicladium test (curative)
[Residence period in hours: 42]

| Active compound | | Infection as a percentage of the infection of the untreated control with a concentration of active compound | |
|---|---|---|---|
| | | 0.1 | 0.025 |
| 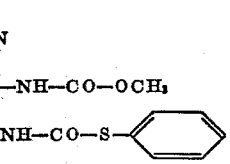 (known) | (A) | 100 | 100 |
| | (2) | 3 | |
| | (3) | 0 | 24 |
| | (4) | 0 | 10 |
| | (5) | | 19 |

TABLE 5—Continued

| Active compound | | Infection as a percentage of the infection of the untreated control with a concentration of active compound | |
|---|---|---|---|
| | | 0.1 | 0.025 |
| benzimidazole-NH-CO-OCH₃ with O=C-NH-C(O)-O-cyclohexyl (H) | (6) | -------- | 5 |
| benzimidazole-NH-CO-OCH₃ with O=C-NH-C(O)-O-C₆H₄-C(CH₃)₃ | (1) | -------- | 3 |

EXAMPLE 6

Piricularia and Pellicularia test

Solvent: 4.00 parts by weight acetone.
Dispersing agent: 0.05 part by weight sodium oleate.
Water: 95.75 parts by weight $H_2O$.
Other additives: 0.20 part by weight gelatin.

The amount of the particular active compound required for the desired concentration of such active compound in the spray liquor is mixed with the stated amount of solvent, and the concentrate is diluted with the stated amount of water containing the stated additives.

Two batches each consisting of 30 rice plants about 2–4 weeks old are sprayed with the spray liquor until dripping wet. The plants remain in a green-house at temperatures of 22 to 24° C. and a relative atmospheric humidity of about 70% until they are dry. One batch of the plants is then inoculated with an aqueous suspension of 100,000 to 200,000 spores/ml. of *Piricularia oryzae* and placed in a chamber at 24–26° C. and 100% relative atmospheric humidity. The other batch of the plants is infected with a culture of *Pellicularia sasakii* grown in malt agar and placed in a chamber at 28–30° C. and 100% relative atmospheric humidity.

5 to 8 days after inoculation, the infection of all the leaves present at the time of inoculation with *Piricularia oryzae* is determined as a percentage of the untreated but also inoculated control plants. In the case of the plants infected with *Pellicularia sasakii*, the infection on the leaf sheaths after the same time is also determined in proportion to the untreated but infected control. 0% means no infection; whereas 100% means that the infection is exactly as great as in the case of the control plants.

The particular active compounds tested, their concentrations and the results obtained can be seen from the following Table 6.

Additional test/curative fungicidal action

In order to determine the curative fungicidal action, the hereinbefore described test is repeated, the particular active compound, however, being applied not before, but only 16 hours after, inoculation.

The particular active compounds tested, their concentrations and the results obtained can also be seen from the following Table 6.

TABLE 6

Piricularia and Pellicularia test
[Pr.=protective; Cur.=curative]

| Active compound | | | Infection as a percentage of the infection of the untreated control with a concentration of active compound of— | | | |
|---|---|---|---|---|---|---|
| | | | 0.05 | 0.025 | 0.05 | 0.025 |
| | | | Piricularia test | | Pellicularia test | |
| phthalimide-N-S-CCl₃ (known) | (A) | Pr. Cur. | 25 100 | -------- -------- | 100 -------- | -------- |
| benzimidazole-NH-CO-OCH₃ with C-NH-CO-S-phenyl | (2) | Pr. Cur. | 0 25 | 0 -------- | 0 | 0 |
| benzimidazole-NH-CO-OCH₃ with NH-CO-O-C₈H₁₇-n | (3) | Pr. Cur. | 0 25 | 0 -------- | 0 | 0 |

TABLE 6—Continued

| Active compound | | Infection as a percentage of the infection of the untreated control with a concentration of active compound of— | | | |
|---|---|---|---|---|---|
| | | 0.05 | 0.025 | 0.05 | 0.025 |
| | | Piricularia test | | Pellicularia test | |
| [benzimidazole structure with —NH—CO—OCH₃ and —NH—CO—S—C₄H₉-n] | (4) Pr. | 0 | 0 | 0 | 0 |
| | Cur. | 25 | | | |
| [benzimidazole structure with —NH—CO—OCH₃ and —NH—CO—S—C₁₂H₂₅-n] | (5) Pr. | 0 | 0 | | |
| [benzimidazole structure with —NH—CO—OCH₃ and —NH—CO—O—phenyl] | (7) Pr. | 0 | | 0 | |

EXAMPLE 7

Fusicladium test (apple scab) (Protective)

Solvent: 4.7 parts by weight acetone.
Emulsifier: 0.3 part by weight alkylaryl polyglycol ether.
Water: 95.0 parts by weight.

The amount of the particular active compound required for the desired final concentration of such active compound in the spray liquid is mixed with the stated amount of solvent, and the resulting concentrate is then diluted with the stated amount of water containing the stated emulsifier.

Young apple seedlings in the 4-6 leaf stage are sprayed with the given spray liquid until dripping wet. The plants remain in a green-house for 24 hours at 20° C. and at a relative atmospheric humidity of 70%. Such plants are then inoculated with an aqueous conidium suspension of the apple scab causative organism (*Fusicladium dentriticum* Fuck.) and incubated for 18 hours in a humidity chamber kept at 18-20° C. and at a relative atmospheric humidity of 100%.

The plants are then again placed in a green-house for 14 days.

15 days after inoculation, the infestation of the seedlings is determined as a percentage of the untreated but also inoculated control plants.

0% means no infestation; whereas 100% means that the infestation is exactly as great as in the case of the control plants.

The particular active compounds tested, their concentrations and the results obtained can be seen from the following Table 7.

TABLE 7
Fusicladium test (protective)

| Active compound | | Infection as a percentage of the infection of the untreated control with a concentration of active compound of— | | |
|---|---|---|---|---|
| | | 0.025 | 0.0062 | 0.00156 |
| [phthalimide with N—S—CCl₃] | (A) | 6 | 10 | 32 |
| (known) | | | | |
| [benzimidazole with —NH—CO—OCH₃ and —NH—CO—S—phenyl] | (2) | 4 | 2 | |
| [benzimidazole with —NH—CO—OCH₃ and —NH—CO—O—C₈H₁₇-n] | (3) | 0 | 1 | 12 |
| [benzimidazole with —NH—CO—OCH₃ and —NH—CO—S—C₄H₉-n] | (4) | 0 | 2 | 17 |
| [benzimidazole with —NH—C(O)—OCH₃ and —NH—C(O)—O—phenyl(H)] | (6) | | | 15 |

EXAMPLE 8

Seed dressing test/bunt of wheat (seed-born mycosis)

To produce a suitable dry dressing, the particular active compound is extended with a mixture of equal parts by weight of talc and kieselguhr to provide a finely powdered mixture with the desired final concentration of such active compound.

Wheat seed is contaminated with 5 g. of the chlamydospores of *Tilletia caries* per kg. of seed. To apply the given dressing, the seed is shaken with such dressing in a closed glass flask. The seed, on moist loam under a cover of a layer of muslin and 2 cm. of moderately moist compost soil, is exposed to optimum germination conditions for the spores for 10 days at 10° C. in a refrigerator.

The germination of the spores on the wheat grains, each of which is contaminated with about 100,000 spores, is subsequently determined microscopically. The smaller the number of spores which have germinated, the more effective is the given active compound.

The particular active compounds tested, their concentrations in the dressing, the amounts of dressing used and the percentage spore germination can be seen from the following Table 8.

compound is taken up in the stated amount of solvent.

The preparation of the active compound is added to potato dextrose agar (which has been liquefied by heating) in such an amount that the desired concentration of the particular active compound is set up therein. After thorough shaking to achieve a uniform dispersion of the given active compound, the agar is poured into Petri dishes under sterile conditions. When the mixture of substrate and active compound has solidified, test fungi from pure cultures are inoculated onto it in small discs of 5 mm. diameter. The Petri dishes remain at 20° C. for 3 days for incubation.

After this time, the inhibiting action of the active compound on the mycelium growth is determined in categories, taking into account the untreated control. 0 means no mycelium growth, either on the treated substrates or on the inoculum; the symbol — means mycelium growth on the inoculum only, no spread to be treated substrate;

TABLE 8
Seed dressing test/bunt of wheat

| Active compound | | Concentration of active compound in the dressing, percent by weight | Amount applied of dressing in g./kg. seed | Spore germination in percent |
|---|---|---|---|---|
| Non-dressed | | | | >10 |
| 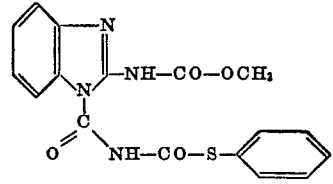 | (2) | 3<br>10<br>30 | 1<br>1<br>1 | 0.000<br>0.000<br>0.000 |
| 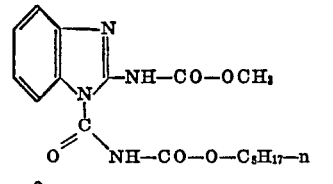 | (3) | 10<br>30 | 1<br>1 | 0.005<br>0.000 |
| 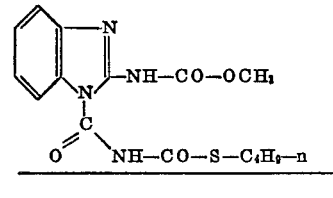 | (4) | 10<br>30 | 1<br>1 | 0.005<br>0.000 |

EXAMPLE 9

Agar plate test.—Test for fungitoxic effectiveness and breadth of the activity spectrum Solvent: acetone parts by weight: (a) 1000; (b) 100.

To produce a suitable preparation of the particular active compound, 1 part by weight of the given active and the symbol + means mycelium growth from the inoculum onto the treated substrate, similar to the spread to the untreated substrate on the control.

The particular active compounds tested, their concentrations, the test fungi and the inhibition effects achieved can be seen from the following Table 9.

TABLE 9
Agar plate test

| Active compound | | Concentration of active compound in the substrate in p.p.m. | Sclerotinia sclerotiorum | Verticillium alboatrum | Thielaviopsis basicola | Fusarium culmorum | Fusarium oxysporum |
|---|---|---|---|---|---|---|---|
| Untreated | | | + | + | + | + | + |
| 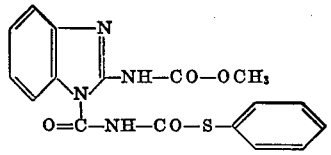 | (2) | 10<br>100 | 0<br>0 | +<br>0 | 0<br>0 | 0<br>0 | 0<br>0 |

TABLE 9—Continued

| Active compound | | Concentration of active compound in the substrate in p.p.m. | Sclerotinia sclerotiorum | Verticillium alboatrum | Thielaviopsis basicola | Fusarium culmorum | Fusarium oxysporum |
|---|---|---|---|---|---|---|---|
| [benzimidazole with —NH—CO—OCH$_3$ and O=C—NH—CO—O—C$_8$H$_{17}$-n] | (3) | 10<br>100 | 0<br>0 | 0<br>0 | 0<br>0 | 0<br>0 | 0<br>0 |
| [benzimidazole with —NH—CO—OCH$_3$ and O=C—NH—CO—S—C$_4$H$_9$-n] | (4) | 10<br>100 | 0<br>0 | 0<br>0 | 0<br>0 | 0<br>0 | 0<br>0 |
| [benzimidazole with X—NH—CO—OCH$_3$ and O=C—NH—CO—S—C$_{12}$H$_{25}$-n] | (5) | 10<br>100 | 0<br>0 | 0<br>0 | 0<br>0 | 0<br>0 | 0<br>0 |
| [benzimidazole with —NH—CO—OCH$_3$ and O=C—NH—CO—O—cyclohexyl] | (6) | 10<br>100 | 0<br>0 | 0<br>0 | 0<br>0 | 0<br>0 | 0<br>0 |
| | | 10<br>100 | 0<br>0 | 0<br>0 | 0<br>0 | 0<br>0 | 0<br>0 |

EXAMPLE 10

Mycelium growth test

Nutrient medium used:

20 parts by weight agar-agar (powdered),
30 parts by weight malt extract,
950 parts by weight H$_2$O.

Proportion of solvent to nutrient medium:

2 parts by weight acetone,
100 parts by weight agar nutrient medium.

The amount of the particular active compound required for the desired final concentration of such active compound in the nutrient medium is mixed with the stated amount of solvent. The resulting concentrate is then thoroughly mixed, in the stated proportion, with the liquid nutrient medium (which has been cooled to 42° C.) and is thereafter poured into Petri dishes of 9 cm. diameter. Control dishes to which the active compound preparation has not been added are also set up.

When the nutrient medium has cooled and solidified, the dishes are inoculated with the species of fungi stated in the table below and incubated at about 21° C.

Evaluation is carried out after 4–10 days, dependent upon the rate of growth of the fungi. When evaluation is carried out the radial growth of the mycelium on the treated nutrient media is compared with the growth on the control nutrient media. In the evaluation of the fungus growth, the following characteristic values are used:

0 no fungus growth
1 very strong inhibition of growth
2 medium inhibition of growth
3 slight inhibition of growth
4 growth equal to that of untreated control.

The particular active compounds tested, their concentrations, and the results obtained can be seen from the following Table 10.

TABLE 10
Mycelium growth test

| Active compound | | Concentration of active compound in p.p.m. | Piricularia oryzae | Phialophora cinerescens | Hypochnus sasakii | Cercospora musae | Verticillium albo-atrum | Fusarium dianthi |
|---|---|---|---|---|---|---|---|---|
| [phthalimide N—S—CCl$_3$] (known) | (A) | 5 | 4 | 4 | 5 | 4 | 4 | 4 |
| [benzimidazole with —NH—CO—OCH$_3$ and O=C—NH—CO—S—phenyl] | (2) | 5 | 0 | 0 | 0 | 0 | 0 | 0 |

TABLE 10—Continued

| Active compound | | Concentration of active compound in p.p.m. | Piricularia oryzae | Phialophora cinerescens | Hypochnus sasakii | Cercospora musae | Verticillium albo-atrum | Fusarium dianthi |
|---|---|---|---|---|---|---|---|---|
| benzimidazole-NH-CO-OCH₃ with N-CO-NH-CO-O-C₈H₁₇-n | (3) | 5 | 0 | 0 | 0 | 0 | 0 | 0 |
| benzimidazole-NH-CO-OCH₃ with N-CO-NH-CO-S-C₄H₉ | (4) | 5 | 0 | 0 | 0 | 0 | 0 | 0 |
| benzimidazole-NH-CO-O-CH₃ with N-CO-NH-CO-S-C₁₂H₂₅ | (5) | 5 | 0 | 0 | 0 | 0 | 0 | 0 |
| benzimidazole-NH-CO-OCH₃ with N-CO-NH-CO-O-phenyl | (7) | 10 | 0 | 0 | 0 | 0 | 0 | 0 |

EXAMPLE 11

Podosphaera test (systemic)

Solvent: 4.7 parts by weight acetone.
Emulsifier: 0.3 part by weight alkylaryl polyglycol ether.
Water: 95.0 parts by weight.

The amount of the particular active compound required for the desired concentration of the given active compound in the liquid to be used for watering is mixed with the stated amount of solvent, and the resulting concentrate is diluted with the stated amount of water which contains the stated additions.

Apple seedlings grown in standard soil are, in the 3–4 leaf stage, watered once within one week with 20 cc. of the liquid to be used for watering, in the stated concentrations of the given active compound, with reference to 100 cc. of soil. The plants thus treated are, after treatment, inoculated with conidia of *Podosphaera laucotricha* Salm. and placed in a green-house kept at a temperature of 21–23° C. and at a relative atmospheric humidity of about 70%.

Ten days after the inoculation, the infection of the seedlings is determined as a percentage of the untreated but also inoculated control plants.

0% means no infestation; whereas 100% means that the infection is exactly as great as in the case of the control plants.

The particular active compounds tested, their concentrations and the results obtained can be seen from the following Table 11.

TABLE 11
Podosphaera test (systemic)

| Active compound | | Infection as a percentage of the infection of the untreated control with a concentration of active compound (in percent) of— | |
|---|---|---|---|
| | | 120 p.p.m. | 30 p.p.m. |
| phthalimide-N-S-CCl₃ (known) | (A) | 100 | 100 |
| benzimidazole-NH-C(=O)-OCH₃ with N-C(=O)-NH-C(=O)-S-phenyl | (2) | 18 | 27 |
| benzimidazole-NH-C(=O)-OCH₃ with N-C(=O)-NH-C(=O)-O-C₈H₁₇-n | (3) | 8 | 29 |

TABLE 11—Continued

| Active compound | Infection as a percentage of the infection of the untreated control with a concentration of active compound (in percent) of— | |
|---|---|---|
| | 120 p.p.m. | 30 p.p.m. |
| (4) <br> structure with NH-C(=O)-OCH₃ and NH-C(=O)-S-C₄H₉-n | 5 | 24 |
| (5) <br> structure with NH-COCH₃ and NH-C(=O)-S-C₁₂H₂₅-n | 28 | ---------- |
| (6) <br> structure with NH-C(=O)-OCH₃ and NH-C(=O)-O-phenyl(H) | 7 | 20 |
| (1) <br> structure with NH-C(=O)-OCH₃ and NH-C(=O)-O-phenyl-C(CH₃)₃ | 21 | 29 |

The following further examples illustrate, without limitation, the process for producing the particular new compounds of the present invention.

EXAMPLE 12

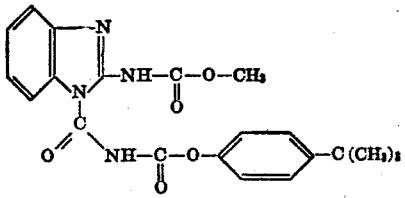

(1)

19.1 g. (0.1 mole) benzimidazole-2-carbamic acid methyl ester and 21.9 g. (0.1 mole) 4-tert.-butylphenoxy-carbonylisocyanate are stirred together in 750 ml. dry chloroform for 5 hours at room temperature. During this time the starting materials have dissolved, except for a small residue. Filtration is effected and the filtrate is evaporated in a vacuum. The residue is washed with cyclohexane and dried. 1-[N-(p-tert.-butylphenoxycarbonyl)-carbamidyl]-benzimidazole - 2 - yl-carbamic acid methyl ester of the melting point 160° C. (with decomposition) is obtained. Yield 40 g., that is 97% of the theory.

EXAMPLE 13

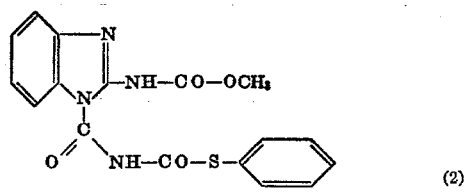

(2)

The above compound is obtained in accordance with the particulars given in Example 12. Melting point: 210° C. (with decomposition).

EXAMPLE 14

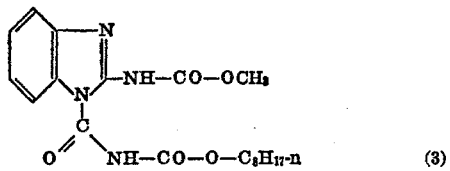

(3)

The above compound is obtained in accordance with the particulars given in Example 12. Melting point: 175° C. (with decomposition).

EXAMPLE 15

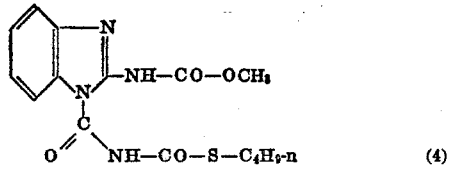

(4)

The above compound is obtained in accordance with the particulars given in Example 12. Melting point: 195° C. (with decomposition).

EXAMPLE 16

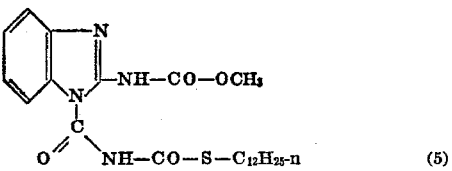

(5)

The above compound is obtained in accordance with the particulars in Example 12. Melting point: 145° C. (with decomposition).

EXAMPLE 17

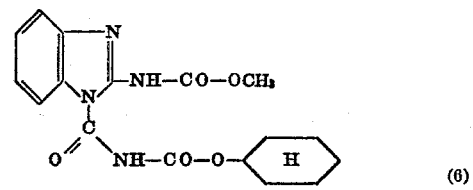

(6)

The above compound is obtained in accordance with the particulars given in Example 12. Melting point 170° C. (with decomposition). Another compound of the invention is 1-[N-(phenoxycarbonyl)-carbamidyl]-benzimidazole-2-yl-carbamic acid methyl ester.

It will be realized by the artisan that all of the foregoing compounds contemplated by the present invention possess the desired strong fungicidal properties, with regard to a broad spectrum of activity, as well as a comparatively low toxicity toward warm-blooded creatures and a concomitantly low phytotoxicity, enabling such compounds to be used with correspondingly favorable compatibility with warm-blooded creatures and plants for more effective control and/or elimination of fungi by application of such compounds to such fungi and/or their habitat.

It will be appreciated that the instant specification and examples are set forth by way of illustration and not lim-

What is claimed is:

1. A fungicidal composition comprising a fungicidally effective amount of a benzimidazole derivative of the formula

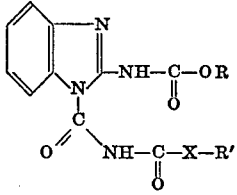

(I)

in which
X stands for oxygen or sulfur,
R stands for lower alkyl, and
R' stands for alkyl of 5 to 12 carbon atoms when X stands for oxygen, alkyl of 1 to 12 carbon atoms when X stands for sulfur, cycloalkyl of 5 to 12 carbon atoms, phenyl or 4-tert.-butyl phenyl, in admixture with a solid diluent or a liquid diluent containing a surface-active agent.

2. The composition according to claim 1 in which R stands for alkyl of 1 to 3 carbon atoms and R' stands for n-butyl, n-octyl, n-dodecyl, phenyl or cyclohexyl.

3. The composition according to claim 1 wherin such compound is [1-(N-phenylmercaptocarbonyl) - carbamidyl]-benzimidazole-2-yl-carbamic acid methyl ester of the formula

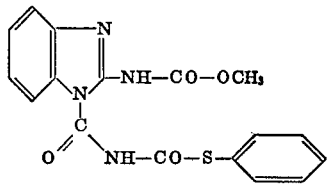

(2)

4. The composition according to claim 1 wherein such compound is 1-[N-(n-octoxycarbonyl)-carbamidyl]-benzimidazole-2-yl-carbamic acid methyl ester of the formula

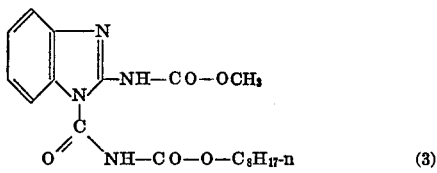

(3)

5. The composition according to claim 1 wherein such compound is 1 - [N - (n - butylmercaptocarbonyl)-carbamidyl]-benzimidazole-2-yl-carbamic acid methyl ester of the formula

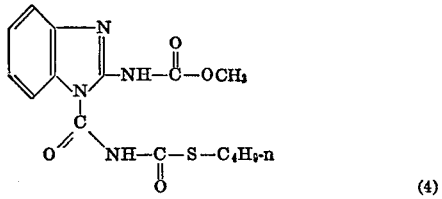

(4)

6. The composition according to claim 1 wherein such compound is 1-[N-(n-dodecylmercaptocarbonyl) - carbamidyl]-benzimidazole-2-yl-carbamic acid methyl ester of the formula

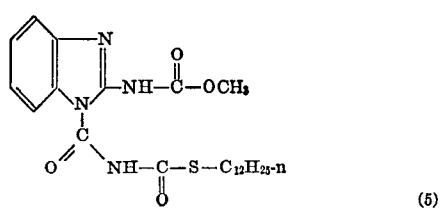

(5)

7. The composition according to claim 1 wherein such compound is 1-[N-(cyclohexyloxycarbonyl)-carbamidyl]-benzimidazole-2-yl-carbamic acid methyl ester of the formula

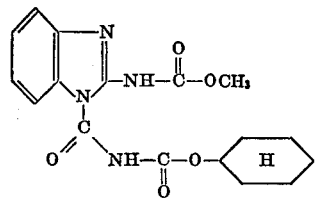

(6)

8. The composition according to claim 1 wherein such compound is 1 - [N - (t - butylphenoxycarbonyl)-carbamidyl]-benzimidazole-2-yl-carbamic acid methyl ester of the formula

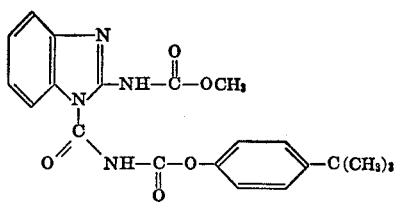

(1)

9. The composition according to claim 1 wherein such compound is 1-[N-(phenoxycarbonyl)-carbamidyl]-benzimidazole-2-yl-carbamic acid methyl ester of the formula

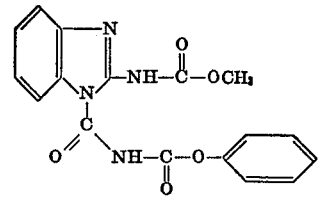

(7)

10. A method of combating fungus pests which comprises applying to said pests or a habitat thereof a fungicidally effective amount of a benzimidazole derivative of the formula

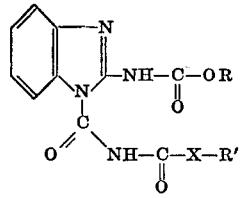

(I)

in which
X stands for oxygen or sulfur,
R stands for lower alkyl, and
R' stands for alkyl of 5 to 12 carbon atoms when X stands for oxygen, alkyl of 1 to 12 carbon atoms when X stands for sulfur, cycloalkyl of 5 to 12 carbon atoms, phenyl or 4-tert.-butyl phenyl.

11. The method according to claim 10 wherein such benzimidazole derivative is:
1-[N-(phenylmercaptocarbonyl)-carbamidyl]-benzimidazole-2-yl-carbamic acid methyl ester;
1-[N-(n-octoxycarbonyl)-carbamidyl]-benzimidazole-2-yl-carbamic acid methyl ester;
1-[N-(n-butylmercaptocarbonyl)-carbamidyl]-benzimidazole-2-yl-carbamic acid methyl ester;
1-[N-(n-dodecylmercaptocarbonyl)-carbamidyl]-benzimidazole-2-yl-carbamic acid methyl ester;
1-[N-(cyclohexyloxycarbonyl)-carbamidyl]-benzimidazole-2-yl-carbamic acid methyl ester;

1-[N-(t-butylphenoxycarbonyl)-carbamidyl]-benzimidazole-2-yl-carbamic acid methyl ester; or 1-[N-(phenoxycarbonyl)-carbamidyl]-benzimidazole-2-yl-carbamic acid methyl ester.

References Cited

UNITED STATES PATENTS

| | | | |
|---|---|---|---|
| 2,933,504 | 4/1960 | Klopping | 260—309.2 |
| 3,010,968 | 11/1961 | Loux | 260—309.2 |
| 3,541,213 | 11/1970 | Klopping | 260—309.2 |
| 3,574,845 | 4/1971 | Actor | 260—309.2 |
| 3,662,069 | 5/1972 | Dittmar | 260—309.2 |

FOREIGN PATENTS

| | | | |
|---|---|---|---|
| 1,523,597 | 11/1970 | France | 260—309.2 |

ALBERT T. MEYERS, Primary Examiner

A. J. ROBINSON, Assistant Examiner

UNITED STATES PATENT OFFICE
CERTIFICATE OF CORRECTION

Patent No. 3,803,318  Dated April 9, 1974

Inventor(s) ARNO WIDDIG ET AL

It is certified that error appears in the above-identified patent and that said Letters Patent are hereby corrected as shown below:

Col. 2, line 41, change "high" to -- higher --.

Col. 3, line 72, correct spelling of "odor".

Col. 8, Table 2, Compound No. (2), correct formula to read as follows:

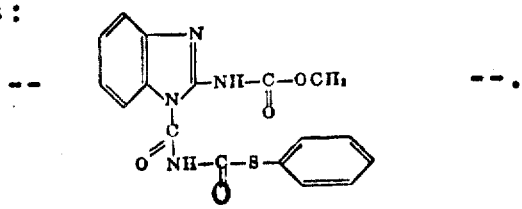

Col. 9, Table 3, Compound (2), in the last column of Table, insert -- 0 --.

Col. 15, Table 7, under formula of Compound (A), insert -- (known) --.

Col. 16, line 38, Table 7, cancel "(known)".

Col. 20, Table 10, Compound (A), under the heading "Hypochnus sasakii", cancel "5" and substitute -- 4 --.

Col. 21, line 63, correct spelling of "leucotricha".

Signed and sealed this 22nd day of October 1974.

(SEAL)
Attest:

McCOY M. GIBSON JR.
Attesting Officer

C. MARSHALL DANN
Commissioner of Patents